United States Patent
Kumar et al.

(10) Patent No.: US 9,529,691 B2
(45) Date of Patent: Dec. 27, 2016

(54) MONITORING AND CORRELATING A BINARY PROCESS IN A DISTRIBUTED BUSINESS TRANSACTION

(71) Applicant: AppDynamics, Inc., San Francisco, CA (US)

(72) Inventors: Pankaj Kumar, San Francisco, CA (US); Amod Gupta, San Francisco, CA (US); Sanjay Nagaraj, Dublin, CA (US); Michael Margulis, Danville, CA (US)

(73) Assignee: AppDynamics, Inc., San Francisco, CA (US)

( * ) Notice: Subject to any disclaimer, the term of this patent is extended or adjusted under 35 U.S.C. 154(b) by 0 days.

(21) Appl. No.: 14/530,633

(22) Filed: Oct. 31, 2014

(65) Prior Publication Data

US 2016/0124832 A1 May 5, 2016

(51) Int. Cl.
*G06F 9/44* (2006.01)
*G06F 11/34* (2006.01)
*G06F 11/30* (2006.01)

(52) U.S. Cl.
CPC ....... *G06F 11/3466* (2013.01); *G06F 11/3003* (2013.01); *G06F 11/3093* (2013.01); *G06F 2201/815* (2013.01); *G06F 2201/865* (2013.01)

(58) Field of Classification Search
CPC .......................................................... G06F 9/44
USPC ........................................ 717/127, 128, 141
See application file for complete search history.

(56) References Cited

U.S. PATENT DOCUMENTS

| | | | |
|---|---|---|---|
| 5,958,010 | A | 9/1999 | Agarwal |
| 6,026,237 | A | 2/2000 | Berry et al. |
| 6,125,382 | A | 9/2000 | Brobst et al. |
| 6,336,148 | B1 | 1/2002 | Doong et al. |
| 6,336,213 | B1 | 1/2002 | Beadle et al. |

(Continued)

FOREIGN PATENT DOCUMENTS

| | | |
|---|---|---|
| GB | 2 518 739 | 4/2015 |
| WO | WO 2015/058204 | 4/2015 |
| WO | 2016069040 A1 | 5/2016 |

OTHER PUBLICATIONS

U.S. Appl. No. 14/530,436, filed Oct. 31, 2014, Brad Winslow, Agent Dynamic Service.

(Continued)

*Primary Examiner* — Chat Do
*Assistant Examiner* — Jae Jeon
(74) *Attorney, Agent, or Firm* — Bachmann Law Group

(57) ABSTRACT

A dynamic monitoring process begins with configuring a start and end method to be monitored. The dynamic monitoring process may intercept both the start and end methods as and when the loader is initiated or at runtime to dynamically attach and detach the instrumentation. A loader may then be modified to call a library method upon detection of the start method. The library method may serve as a notification to the start of the method and causes a reflector to retrieve information from the incoming request. The incoming information may include data from which a business transaction name may be determined. The business transaction name is then associated with the monitoring of the particular request. When an exit call is detected, a call may be made to the library for a method which invokes a decorator. The decorator may insert business transaction name and other data into the outgoing call.

21 Claims, 6 Drawing Sheets

(56) References Cited

U.S. PATENT DOCUMENTS

| | | | |
|---|---|---|---|
| 6,470,494 B1 | 10/2002 | Chan | |
| 6,477,666 B1 | 11/2002 | Sanchez et al. | |
| 6,493,816 B1 | 12/2002 | Munroe | |
| 6,651,108 B2 | 11/2003 | Popp | |
| 6,662,359 B1 | 12/2003 | Berry et al. | |
| 7,054,361 B1 | 5/2006 | Otte et al. | |
| 7,367,025 B1 | 4/2008 | Nikolov et al. | |
| 7,587,487 B1 | 9/2009 | Gunturu | |
| 7,957,934 B2 | 6/2011 | Greifeneder | |
| 8,151,277 B2 | 4/2012 | Greifeneder et al. | |
| 8,248,958 B1 | 8/2012 | Tulasi et al. | |
| 8,312,249 B1* | 11/2012 | Trumbull | 711/203 |
| 8,676,901 B1 | 3/2014 | Nicolaou | |
| 8,863,093 B1 | 10/2014 | Chou et al. | |
| 8,914,626 B1 | 12/2014 | Adogla et al. | |
| 8,965,952 B1* | 2/2015 | Shatalin | G06F 9/541 709/203 |
| 2001/0034016 A1* | 10/2001 | Ziv-el et al. | 434/350 |
| 2002/0018481 A1 | 2/2002 | Mor et al. | |
| 2002/0173997 A1* | 11/2002 | Menard et al. | 705/7 |
| 2002/0174174 A1 | 11/2002 | Ramraj | |
| 2003/0014549 A1 | 1/2003 | Seidman | |
| 2003/0093551 A1* | 5/2003 | Taylor et al. | 709/237 |
| 2004/0006620 A1* | 1/2004 | Howard et al. | 709/224 |
| 2004/0031020 A1 | 2/2004 | Berry et al. | |
| 2004/0039728 A1 | 2/2004 | Fenlon | |
| 2004/0081183 A1 | 4/2004 | Monza | |
| 2004/0153825 A1* | 8/2004 | Morimoto et al. | 714/38 |
| 2005/0033767 A1 | 2/2005 | Kamentz | |
| 2005/0039190 A1 | 2/2005 | Rees et al. | |
| 2005/0091376 A1* | 4/2005 | Helfman | H04L 29/06 709/226 |
| 2005/0155024 A1 | 7/2005 | Wannamaker | |
| 2005/0165584 A1* | 7/2005 | Boody et al. | 702/186 |
| 2005/0243837 A1 | 11/2005 | Boyd et al. | |
| 2005/0264581 A1 | 12/2005 | Patrick et al. | |
| 2005/0273709 A1* | 12/2005 | Lough et al. | 715/517 |
| 2005/0281259 A1 | 12/2005 | Mitchell | |
| 2006/0041539 A1* | 2/2006 | Matchett et al. | 707/3 |
| 2006/0059092 A1 | 3/2006 | Burshan et al. | |
| 2006/0072568 A1 | 4/2006 | Vaananen | |
| 2006/0155803 A1 | 7/2006 | Muramatsu | |
| 2006/0168526 A1* | 7/2006 | Stirbu | 715/740 |
| 2006/0271395 A1 | 11/2006 | Harris | |
| 2006/0280181 A1 | 12/2006 | Brailas et al. | |
| 2007/0027742 A1* | 2/2007 | Emuchay et al. | 705/10 |
| 2007/0067364 A1 | 3/2007 | Barbian et al. | |
| 2007/0088668 A1* | 4/2007 | Larab et al. | 707/1 |
| 2007/0180227 A1 | 8/2007 | Akimoto | |
| 2008/0062993 A1* | 3/2008 | Levy | H04L 29/06 370/392 |
| 2008/0098378 A1* | 4/2008 | Kilbane et al. | 717/162 |
| 2008/0225748 A1 | 9/2008 | Khemani et al. | |
| 2008/0304518 A1 | 12/2008 | Cheng et al. | |
| 2009/0320030 A1 | 12/2009 | Ogasawara | |
| 2010/0088404 A1* | 4/2010 | Mani | H04L 67/02 709/224 |
| 2010/0100890 A1 | 4/2010 | Dar | |
| 2010/0138703 A1* | 6/2010 | Bansal et al. | 714/57 |
| 2010/0162204 A1* | 6/2010 | Baumann et al. | 717/106 |
| 2010/0199259 A1 | 8/2010 | Quinn et al. | |
| 2010/0287541 A1* | 11/2010 | Saunders | G06Q 30/06 717/139 |
| 2011/0222412 A1 | 9/2011 | Kompella | |
| 2011/0252395 A1 | 10/2011 | Charisius et al. | |
| 2011/0276683 A1 | 11/2011 | Goldschlag et al. | |
| 2011/0305160 A1 | 12/2011 | Green et al. | |
| 2012/0005166 A1 | 1/2012 | Pace et al. | |
| 2012/0047276 A1 | 2/2012 | Lindquist et al. | |
| 2012/0047494 A1* | 2/2012 | Unrein et al. | 717/137 |
| 2012/0167057 A1* | 6/2012 | Schmich et al. | 717/130 |
| 2012/0230225 A1 | 9/2012 | Matthews et al. | |
| 2012/0297371 A1 | 11/2012 | Greifeneder et al. | |
| 2012/0304172 A1 | 11/2012 | Greifeneder et al. | |
| 2013/0067074 A1* | 3/2013 | Allen | G06F 9/4843 709/224 |
| 2013/0117132 A1* | 5/2013 | Padwal et al. | 705/14.72 |
| 2014/0059527 A1 | 2/2014 | Gagliardi | |
| 2014/0059528 A1 | 2/2014 | Gagliardi | |
| 2014/0283040 A1 | 9/2014 | Wilkerson et al. | |
| 2015/0067146 A1 | 3/2015 | Raker | |
| 2015/0113122 A1 | 4/2015 | Sunkara | |
| 2015/0124840 A1 | 5/2015 | Bergeron | |
| 2016/0124829 A1 | 5/2016 | Winslow et al. | |

OTHER PUBLICATIONS

U.S. Appl. No. 14/609,298, filed Jan. 29, 2015, Vinay Srinavasaiah, Dynamic Agent Delivery.
PCT Application No. PCT/US2014/061402 International Search Report and Written Opinion dated Jan. 21, 2015.
United Kingdom Application No. GB1413464.7, Search Report dated Jan. 27, 2015.
Czajkowski et al., "Jres: A Resource Accounting Interface for Java", 1998.
Omitriev, "Profiling Java Application Using Code Hotswapping and Dynamic Call Graph Revelation", 2004.
U.S. Appl. No. 14/018,349 Office Action mailed Jan. 22, 2016.
U.S. Appl. No. 14/018,349 Office Action mailed Sep. 11, 2015.
U.S. Appl. No. 14/058,200 Office Action mailed Feb. 1, 2016.
U.S. Appl. No. 14/058,200 Third-Party Submission mailed May 20, 2015.
U.S. Appl. No. 14/530,436 Office Action mailed Mar. 24, 2016.
U.S. Appl. No. 14/609,298 Office Action mailed Jul. 17, 2015.
Gregersen et al., "Javeleon: An Integrated Platform for Dynamic Software Updating and its Application in Self-Systems", 2012.
PCT Application No. PCT/US2015/013873 International Search Report and Written Opinion dated Jun. 9, 2015.

* cited by examiner

MONITORING AND CORRELATING A BINARY PROCESS IN A DISTRIBUTED BUSINESS TRANSACTION

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Applications written in C and C++ language are not as common as those written in .NET or JAVA platforms. Accordingly, there are not many solutions for monitoring these applications. To monitor a C++ application, it is required to instrument the application and recompile the application. As such, previous solutions require a software development kit (SDK) to achieve instrumentation of a C or C++ application. Recompiling and use of the SDK to monitor an application is time consuming and inconvenient.

What is needed is an improved method for monitoring a C or C++ application.

SUMMARY

The present technology provides for dynamic monitoring of a binary process such as a C++ application. The dynamic monitoring process does not require recompiling or rewriting of the binary process when instrumentation is done. The dynamic monitoring process begins with configuring a start and end method to be monitored. The dynamic monitoring process may intercept both the start and end methods as and when the loader is initiated or at runtime to dynamically attach and detach the instrumentation. A loader may then be modified to call a library method upon detection of the start method. The library method may serve as a notification to the start of the method and causes a reflector to retrieve information from the incoming request. The incoming information may include data from which a business transaction name may be determined. The business transaction name is then associated with the monitoring of the particular request. When an exit call is detected, a call may be made to the library for a method which invokes a decorator. The decorator may insert business transaction name and other data into the outgoing call. By using reflectors and decorators to retrieve information and write information regarding incoming and outgoing requests, the present technology achieves correlation between applications of different types, such as C, C++ and other binary processes, .NET, Java and other applications. An embodiment may include a method for monitoring an application. The method may begin with monitoring a binary process on a first machine. Communication with the binary process may be detected by a second application on a second machine, wherein the second application not a binary process. The binary process and the second application are may be correlated as part of a distributed business transaction across the first machine and the second machine.

An embodiment may include a system for monitoring a business transaction. The system may include a processor, a memory and one or more modules stored in memory and executable by the processor. When executed, the one or more modules may monitor a binary process on a first machine, detect communication with the binary process by a second application on a second machine, the second application not a binary process, and correlate the binary process and the second application as part of a distributed business transaction across the first machine and the second machine.

DETAILED DESCRIPTION

The present technology provides for dynamic monitoring of a binary process such as a C++ application. The dynamic monitoring process does not require recompiling or rewriting of the binary process when instrumentation is done. The dynamic monitoring process begins with configuring a start and end method to be monitored. The dynamic monitoring process may intercept both the start and end methods as and when the loader is initiated or at runtime to dynamically attach and detach the instrumentation. A loader may then be modified to call a library method upon detection of the start method. The library method may serve as a notification to the start of the method and causes a reflector to retrieve information from the incoming request. The incoming information may include data from which a business transaction name may be determined. The business transaction name is then associated with the monitoring of the particular request. When an exit call is detected, a call may be made to the library for a method which invokes a decorator. The decorator may insert business transaction name and other data into the outgoing call. By using reflectors and decorators to retrieve information and write information regarding incoming and outgoing requests, the present technology achieves correlation between applications of different types, such as C, C++ and other binary processes, .NET, Java and other applications.

Figure 1:
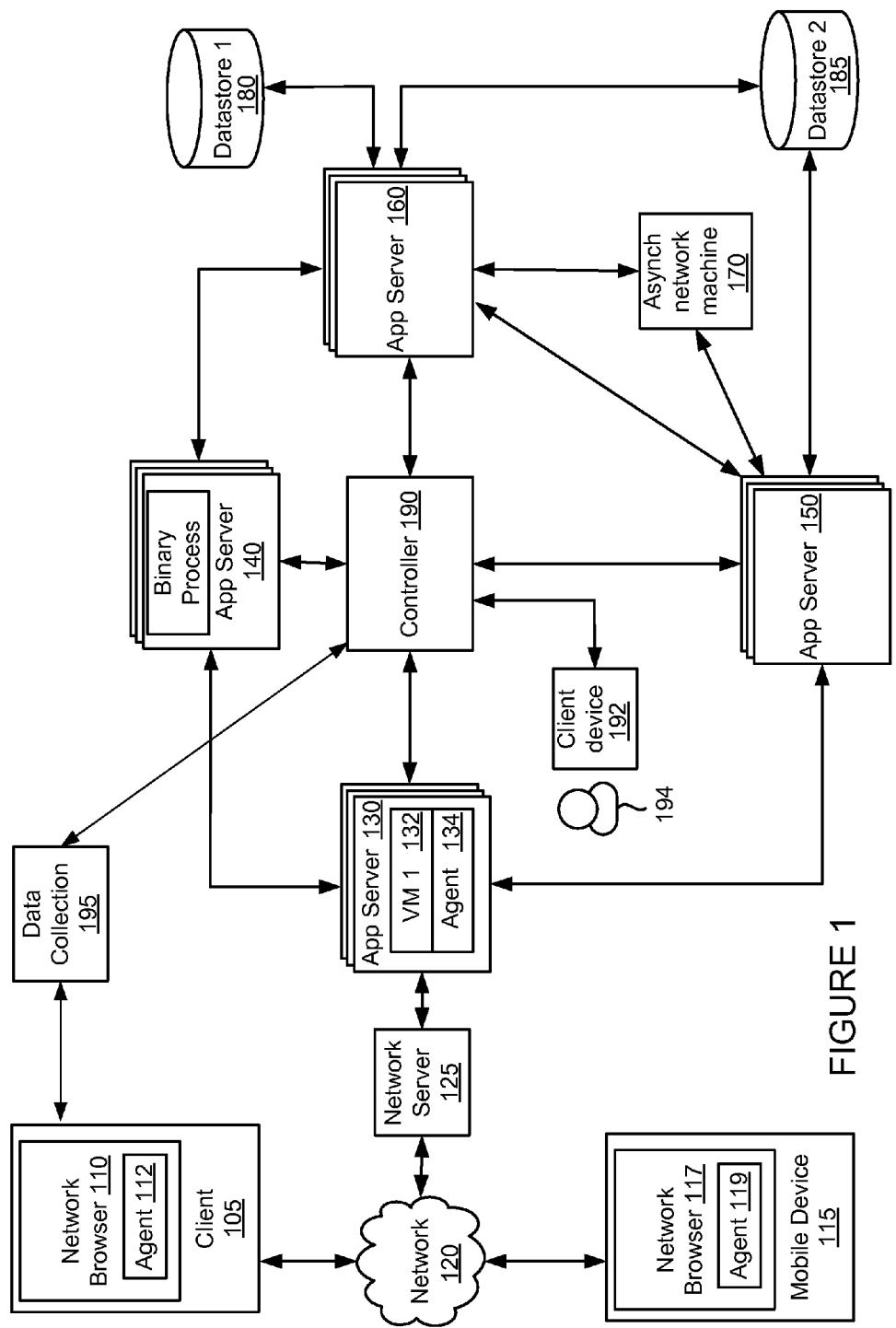
FIG. 1 is a block diagram for monitoring a binary process.

FIG. 1 is a block diagram of a system for monitoring a binary process. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Application servers may or may not include virtual machines. For example, application server 150 may include one or more .NET applications and may not include a virtual machine. Application server 140 includes a binary process, which may for example be implemented as a C or C++ process or program. References to a virtual machine with respect to an application server are intended to be for exemplary purposes only.

Virtual machine 132 on application server 130 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132. More details for instrumenting byte code are disclosed in U.S. application Ser. No. 12/878,919, titled "Monitoring Distributed Web Application Transactions," filed Sep. 9, 2010, the disclosure of which is incorporated herein by reference.

In embodiments, application server 130 may include software other than virtual machines, such as for example one or more programs and/or modules that processes AJAX requests.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Application server 140 may include binary process 140. The binary process may include a process in C, C++, FORTRAN, or some other binary language. The binary processing may be monitored through the use of reflectors and decorators along with calls to library methods. As such, the binary process of application 140 may be correlated to virtual machines and other software processing requests in any of application servers 130, 150 and 160 as part of a distributed business transaction.

In some instances, each of application servers 140, 150 and 160 may include an application and an agent (not illustrated in FIG. 1). Each application may run on the corresponding application server. Each agents may monitor an application, virtual machine, binary process, or other software processing requests, collect and process data (for example, at runtime of the virtual machines), and communicate with controller 190. The virtual machines, binary processes, and other software processing requests may communicate with each other as part of performing a distributed transaction, and may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
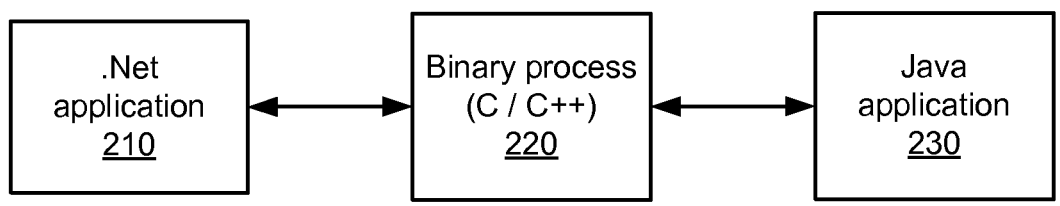
FIG. 2 is a block diagram of a binary process communicating with other types of process applications.

FIG. 2 is a block diagram of a binary process communicating with other types of applications. The binary process (i.e., C, C++) may be correlated with other applications as part of a distributed business transaction. As shown in FIG. 2, the binary process may exist on computing device 220 and may communicate with a .NET application on computing device 210 as well as a JAVA application on computing device 230. The present technology may monitor the binary process, such as a C or C++ process, and correlate communications between the binary process and other frameworks such as a .NET framework and a JAVA framework as part of a single distributed business transaction.

Figure 3:
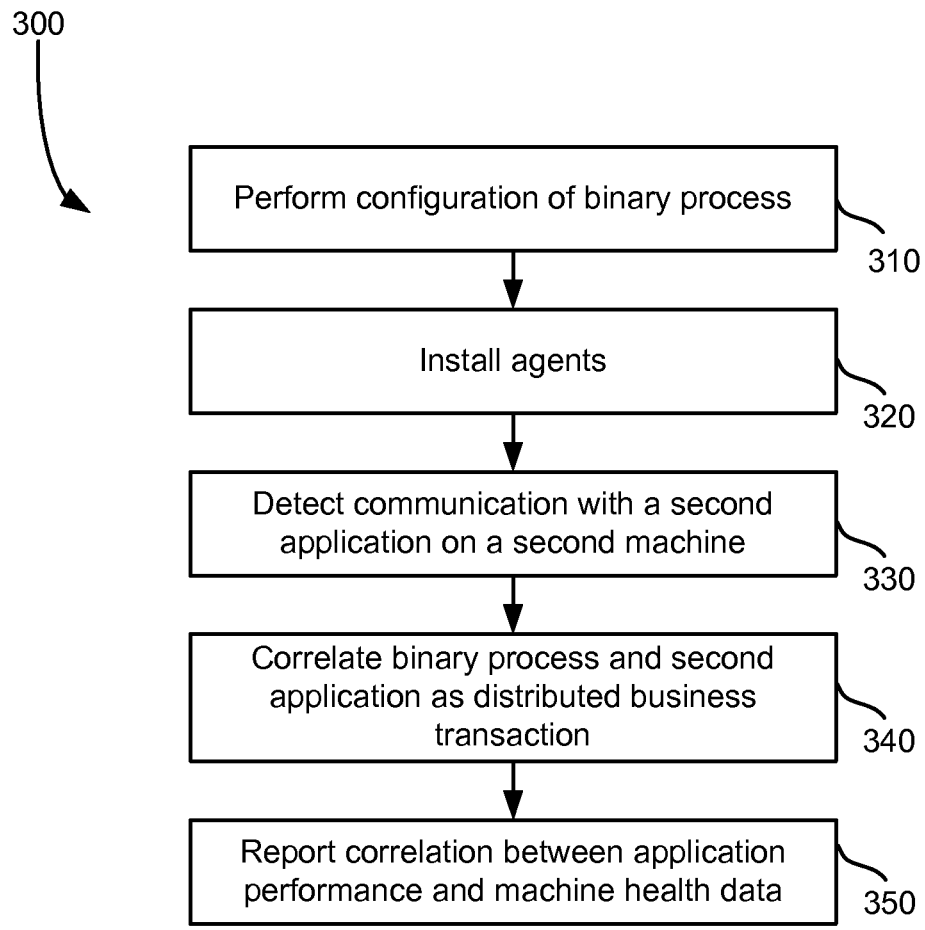
FIG. 3 is a method for monitoring a binary process.

FIG. 3 is a method for monitoring a binary process. First, configuration of a binary process is performed at step 310. The configuration may include identifying a begin method and an end method to be monitored within the binary process. The configuration may also identify a business transaction configuration. Next, agents are installed in the binary process at step 320. Once installed, the agent may instruct a loader how to handle certain processes, including the start method and end method. In particular, an agent may instruct a loader of a method to call for a particular library when an incoming request or outgoing request is detected.

Communication between the binary process and a second application on a second machine may be detected at step 330. Detecting the communication may include determining whether an incoming process or an outgoing process was called. The incoming process may be monitored after the incoming data is collected. Detecting the outgoing process may include writing data to that outgoing process for the business transaction name associated with the call. The outgoing process data allows the method in the binary process to be correlated with methods in a remote application for correlation purposes. Detecting communication within a second application on a second machine is discussed in more detail below with respect to the method of FIG. 4.

The binary application and second application may be correlated as part of a distributed business transaction at step 340. In some instances, an agent may report data to a central controller. The reported data may be collected from an incoming request to the binary process and data provided in outgoing requests made by the binary process. The agent reports the data to a central controller which also receives data originating any incoming requests and any received outgoing requests. The business transaction is formed by the correlated requests and may be analyzed in subsequent reports.

Figure 4:
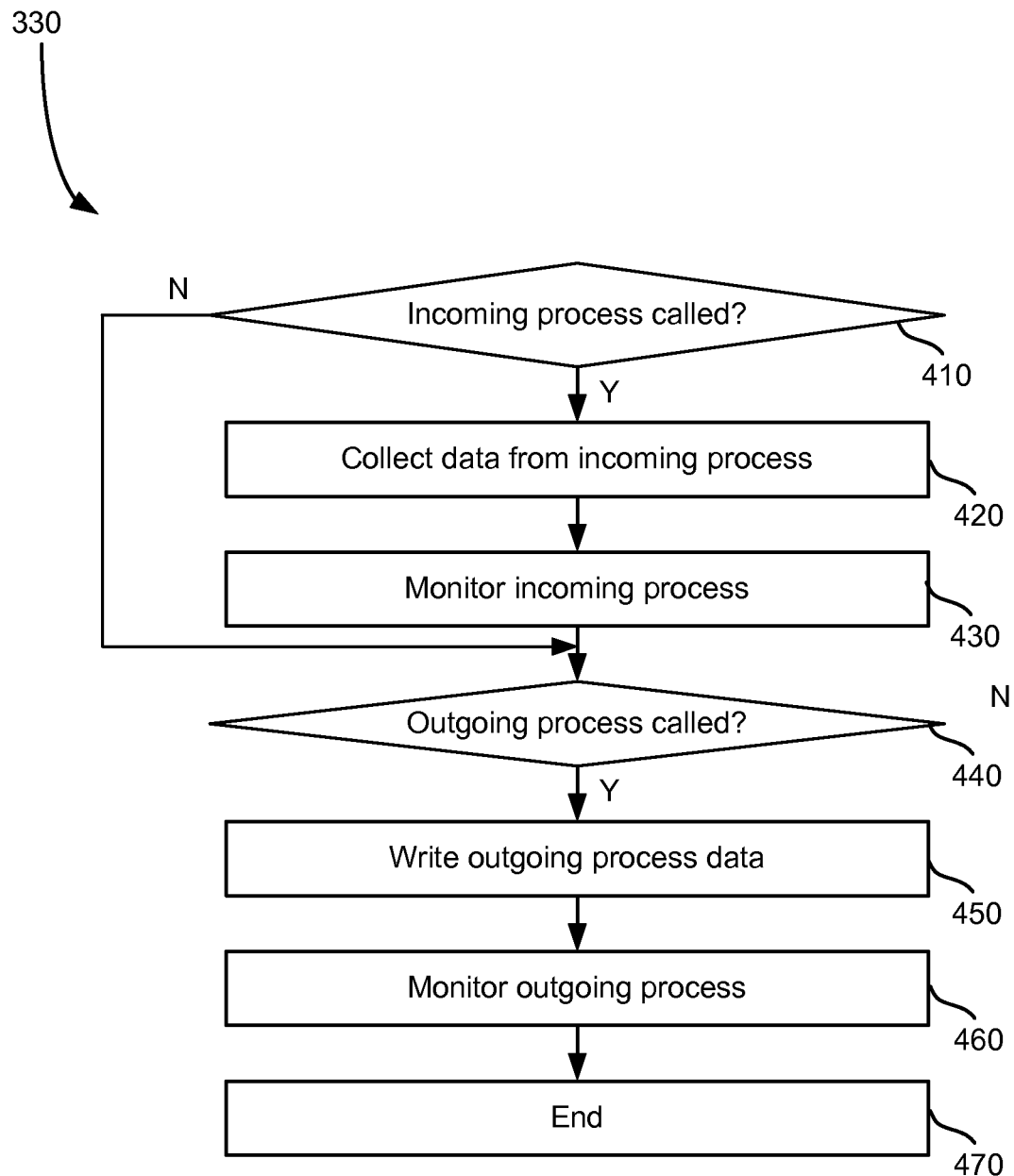
FIG. 4 is a method for detecting communication on a binary process.

FIG. 4 is a method for detecting communication with a second application on a second machine. The method of FIGURE provides more detail for detecting communication as described in step 330 of the method of FIG. 3.

First, a determination is made as to whether an incoming process has been called at step 410. If an incoming process has not been called, the method continues to step 440. If an incoming process is called, data is collected from the incoming process at step 420. The data collection may include a loader calling a library, installing code which will read incoming parameters, determine a business transaction name and storing process data by the agent. Collecting data from an incoming process is discussed in more detail below with respect to the method of FIG. 5.

After collecting data for an incoming process, the incoming process is monitored at step 430. Monitoring the incoming process may include collecting timing data such as the start and end of the process and sub-processes (methods, calls, etc.), method parameters, call stack data, process return values, and exceptions and errors. A call stack may be sampled to generate call graph data associated with the process. Data collected may be recorded by an agent.

A determination is made as to whether an outgoing process is called at step 440. If an outgoing process is called by a method or process being monitored, data is written to the outgoing process at step 440. To write the data, a loader may call a library method and outgoing parameters and a business transaction name may be written to the outgoing request by a decorator invoked by the library method. By writing the outgoing parameters by the decorator, the outgoing request will include information required to correlate the request occurring at the binary process with any request occurring at the external machine which will handle the request. The outgoing process may then be monitored at step 460. Monitoring the outgoing request may include listening for a response received from the recipient of the request and recording data regarding performance of the request. The method of FIG. 4 then ends at step 470.

Figure 5:
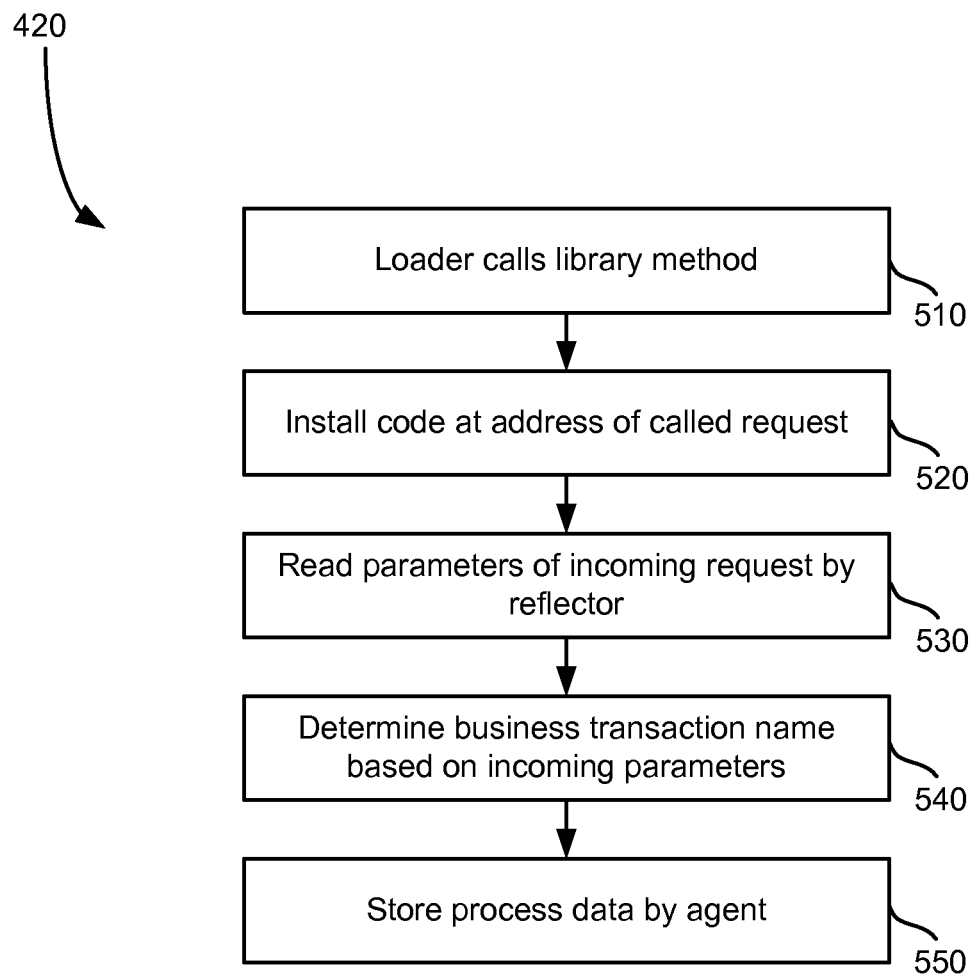
FIG. 5 is a method for collecting incoming process data.

FIG. 5 is a method for collecting incoming process data. The method of FIG. 5 provides more detail for step 420 regarding collecting incoming process data of the method of FIG. 4.

Once an incoming process has been detected, a loader may call a library method at step 510. The call to the library method may serve as a notification that an incoming request was received by the binary process. The call to the library method may result in invoking a reflector module. The method called from the library may cause code to be installed at an address associated with the incoming request at step 520. The address may be retrieved based on the configuration information received earlier.

Once the code is installed at the address of the method, incoming parameters are read by a reflector at step 530. The incoming parameters may include business transaction information, method parameters, and other data. After reading the incoming parameters at the incoming request, a business transaction name may be determined based on those incoming parameters at step 540. Subsequent data captured for performance of that incoming request may then be associated with that business transaction name captured by the reflector. That data is then stored by an agent at step 550.

Figure 6:
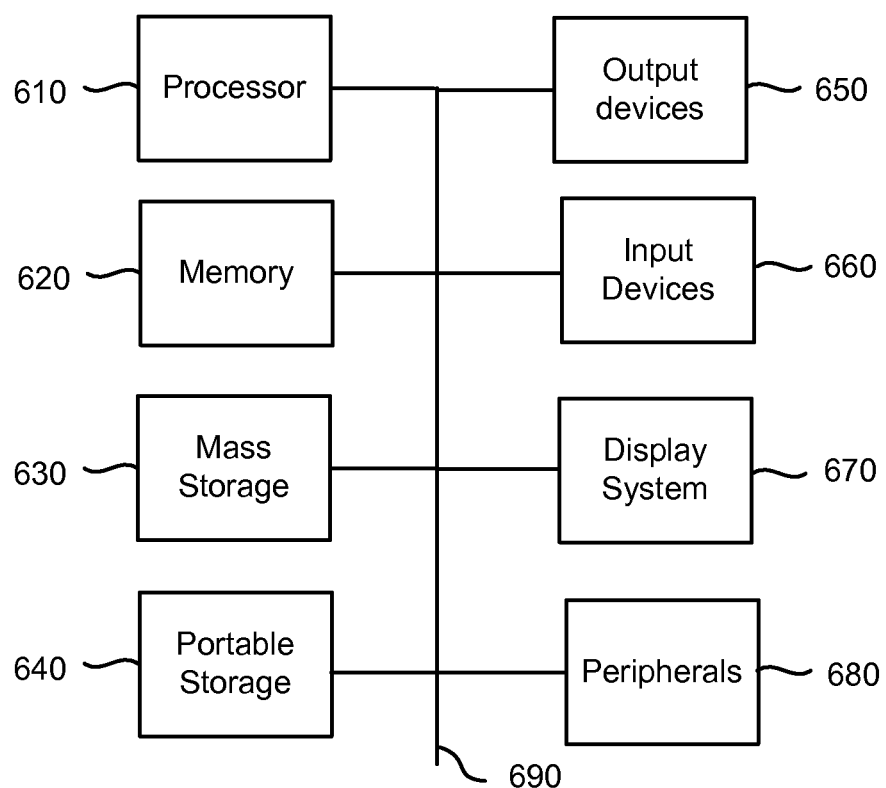
FIG. 6 is a block diagram of a computing environment for implementing the present technology.

FIG. 6 is a block diagram of a computing environment for implementing the present technology. System 600 of FIG. 6 may be implemented in the contexts of the likes of clients 105 and 192, network server 125, application servers 130-160, controller 190, and data stores 180-185. A system similar to that in FIG. 6 may be used to implement mobile device 115, but may include additional components such as an antenna, additional microphones, and other components typically found in mobile devices such as a smart phone or tablet computer.

The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means.

For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include an LED, liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 600 of FIG. 6 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a binary process, comprising:
monitoring a first application implemented as a binary process, the binary process including a process in a binary language and executing on a first machine;
detecting, at the first machine, communication with the binary process by a second application on a second machine, the second application not implemented as a binary process, wherein the communication is sending an outgoing call to the second application;
inserting method parameters into the outgoing call, wherein inserting includes calling a method from a library, in response to detecting the communication, to invoke a reflector module, the called method configured to write parameters;
installing the reflector module at an address associated with the communication, the reflector module reading one or more parameters contained within the detected communication, the one or more parameters including distributed business transaction information;
monitoring the second application on the second machine; and
correlating the first application implemented as a binary process and the second application not implemented as a binary process as part of the distributed business transaction based on data associated with monitoring the binary process and data associated with monitoring the second application, the distributed business transaction implemented by the first application and the second application across the first machine and the second machine.

2. The method of claim 1, wherein the binary process is implemented in C++ language or C language.

3. The method of claim 2, wherein the second application is a java application or a .NET application.

4. The method of claim 1, wherein the communication is receiving a call from the second application, the method further comprising capturing method parameters of an incoming call.

5. The method of claim 4, further comprising determining a name for the distributed business transaction based at least in part from the method parameters.

6. The method of claim 1, further comprising configuring the binary process to identify a begin method and an end method to monitor.

7. The method of claim 1, wherein monitoring includes calling monitoring code from a library from within the binary process.

8. A non-transitory computer readable storage medium having embodied thereon a program, the program being executable by a processor to perform a method for monitoring a binary process, the method comprising:
monitoring a first application implemented as a binary process, the binary process including a process in a binary language and executing on a first machine;
detecting, at the first machine, communication with the binary process by a second application on a second machine, the second application not implemented as a binary process, wherein the communication is sending an outgoing call to the second application;
inserting method parameters into the outgoing call, wherein inserting includes calling a method from a library, in response to detecting the communication, to invoke a reflector module, the called method configured to write parameters;

installing the reflector module at an address associated with the communication, the reflector module reading one or more parameters contained within the detected communication, the one or more parameters including distributed business transaction information;

monitoring the second application on the second machine; and correlating the first application implemented as a binary process and the second application not implemented as a binary process as part of the distributed business transaction based on data associated with monitoring the binary process and data associated with monitoring the second application, the distributed business transaction implemented by the first application and the second application across the first machine and the second machine.

9. The non-transitory computer readable storage medium of claim 8, wherein the binary process is implemented in C++ language or C language.

10. The non-transitory computer readable storage medium of claim 9, wherein the second application is a Java application or a .NET application.

11. The non-transitory computer readable storage medium of claim 8, wherein the communication is receiving a call from the second application, the method further comprising capturing method parameters of an incoming call.

12. The non-transitory computer readable storage medium of claim 11, the method further comprising determining a name for the distributed business transaction based at least in part from the method parameters.

13. The non-transitory computer readable storage medium of claim 8, the method further comprising configuring the binary process to identify a begin method and an end method to monitor.

14. The non-transitory computer readable storage medium of claim 8, wherein monitoring includes calling monitoring code from a library from within the binary process.

15. A system for monitoring an application, comprising:
a processor;
a memory; and
one or more modules stored in memory and executable by a processor to monitor a first application implemented as a binary process, the binary process including a process in a binary language and executing on a first machine, detect, at the first machine, communication with the binary process by a second application on a second machine, the second application not implemented as a binary process wherein the communication is sending an outgoing call to the second application, insert method parameters into the outgoing call, wherein insert includes call a method from a library, in response to detecting the communication, to invoke a reflector module, the called method configured to write parameters, install the reflector module at an address associated with the communication, the reflector module reading one or more parameters contained within the detected communication, the one or more parameters including distributed business transaction information, monitor the second application on the second machine, and correlate the first application implemented as a binary process and the second application not implemented as a binary process as part of the distributed business transaction based on data associated with monitoring the binary process and data associated with monitoring the second application, the distributed business transaction implemented by the first application and the second application across the first machine and the second machine.

16. The system of claim 15, wherein the binary process is implemented in C++ language or C language.

17. The system of claim 16, wherein the second application is a java application or a .NET application.

18. The system of claim 15, wherein the communication is receiving a call from the second application, the method further comprising capturing method parameters of an incoming call.

19. The system of claim 18, the one or more modules further executable to determine a name for the distributed business transaction based at least in part from the method parameters.

20. The system of claim 15, the one or more modules further executable to configure the binary process to identify a begin method and an end method to monitor.

21. The system of claim 15, wherein monitoring includes calling monitoring code from a library from within the binary process.

* * * * *